United States Patent [19]

Black

[11] 4,294,491
[45] Oct. 13, 1981

[54] METAL DISK WHEEL WITH RESILIENT TREAD AND BEARING SUPPORT

[75] Inventor: John W. Black, Hickory Corners, Mich.

[73] Assignee: Pemco-Kalamazoo, Inc., Kalamazoo, Mich.

[21] Appl. No.: 145,279

[22] Filed: Apr. 30, 1980

Related U.S. Application Data

[63] Continuation of Ser. No. 964,133, Nov. 27, 1978, abandoned.

[51] Int. Cl.³ .................. B60B 1/06; F16C 33/00
[52] U.S. Cl. .................. 301/63 DD; 301/105 R; 308/190; 308/191; 428/64
[58] Field of Search ...... 428/64; 301/63 DD, 63 PW, 301/5.7, 105 R; 308/190, 191, 18

[56] References Cited

U.S. PATENT DOCUMENTS

| | | | |
|---|---|---|---|
| 1,882,498 | 10/1932 | Jarvis . | |
| 2,338,294 | 1/1944 | Maule . | |
| 2,692,801 | 10/1954 | Rosenberg | 301/63 DD |
| 2,921,344 | 1/1960 | Carrico | 301/63 PW |
| 3,020,091 | 2/1962 | Solomon | 301/63 DD |
| 3,235,312 | 2/1965 | Hollander | 301/63 PW |
| 3,387,894 | 6/1968 | Loulk | 301/63 DD |
| 3,666,322 | 5/1972 | Pickron | 301/63 PW |
| 3,695,728 | 10/1972 | Haussels | 301/63 DD |
| 3,807,817 | 4/1974 | Black | 308/190 |
| 3,815,959 | 6/1974 | Hill | 301/63 PW |
| 3,894,776 | 7/1975 | Black | 301/63 DD |
| 3,952,786 | 4/1976 | Kreling et al. | 301/63 PW |
| 3,968,996 | 7/1976 | Wilcox | 301/63 DD |
| 4,019,789 | 4/1977 | Rosin et al. | 301/63 PW |
| 4,040,670 | 8/1977 | Williams | 301/63 PW |
| 4,071,279 | 1/1978 | Chung | 301/63 PW |
| 4,072,373 | 2/1978 | Black | 308/191 |

FOREIGN PATENT DOCUMENTS

| | | |
|---|---|---|
| 299458 | 10/1928 | United Kingdom . |
| 581845 | 10/1946 | United Kingdom . |
| 1123704 | 8/1968 | United Kingdom . |
| 1169858 | 11/1969 | United Kingdom . |
| 1370998 | 10/1974 | United Kingdom . |

Primary Examiner—William R. Dixon, Jr.
Attorney, Agent, or Firm—Blanchard, Flynn, Thiel, Boutell & Tanis

[57] ABSTRACT

A wheel construction having bearing means therein defining an axis of rotation. The bearing means is housed in an elastomeric sleeve having an elastic compressibility characteristic. A pair of identically shaped metallic stampings, each having a central cylindrical shell part axially aligned with the other, is provided for housing the bearing structure therein. Each of the stampings has a surface portion intermediate the central cylindrical shell part and the outer periphery thereof, which are coextensive with a central plane through the wheel construction perpendicular to the axis of rotation. The axially aligned cylindrical shell parts engage at least a portion of the elastomeric sleeve of the bearing structure. An annulus of moldable synthetic resin material is fixedly secured to the peripheral surface of the pair of metallic stampings to hold the cylindrical shell part and the surface portions in axial alignment. The annulus has an elastically flexible characteristic to thereby permit the pair of stampings to shift radially relative to one another while maintaining said surface portions in sliding engagement with one another.

5 Claims, 3 Drawing Figures

METAL DISK WHEEL WITH RESILIENT TREAD AND BEARING SUPPORT

CROSS REFERENCE TO RELATED APPLICATION

This is a continuation application of Ser. No. 964,133, filed Nov. 27, 1978, now abandoned.

This application is related to my copending application Ser. No. 146,895, filed May 5, 1980.

FIELD OF THE INVENTION

This invention relates to a wheel construction and, more particularly, relates to a wheel construction wherein the elastomeric material of the treadstock and of the sleeve housing for the bearing structure isolates shock loads and the like which are applied to the wheel from the bearing structure.

BACKGROUND OF THE INVENTION

The life expectancy of wheel constructions, particularly the type adapted for use with a yoke assembly, is continuously being subjected to review. Generally, it can be stated that the failure of such a wheel construction is primarily due to a failure in the ball bearing assembly. My U.S. Pat. No. 3,807,817 represents a unique bearing assembly which has substantially prolonged the life of wheel constructions. In addition, such bearing assembly has reduced the cost of the total wheel construction.

The bearing assembly illustrated in my aforementioned U.S. Pat. No. 3,807,817 is a type wherein the axle and the sleeve having the bearings located therebetween are preassembled. However, a problem has existed in protecting the bearing structures from shock loads which are, from time to time, applied to the support construction, particularly the yoke. It is well known that the life of a bearing, hence of the wheel upon which it is mounted, is materially affected by the amount of looseness or play in the bearing parts thereof. Thus, where bearing parts are assembled with an excess amount of initial play, the useful life of the bearing is shortened in a corresponding manner. That is, unnecessary run out, radial play or axial play in the bearing parts relative to each other, or in the bearing parts relative to the wheel which they support, will tend to induce or accelerate wear which merely increases the play. In a sense, this results from the fact that the loose parts have an opportunity to hammer each other during normal use of the wheel or other structure in which the loose bearing is used. This acceleration and deterioration of loose bearing assemblies is especially noticeable in situations of severe usage, such as in the wheels of casters.

Furthermore, it has been largely taken for granted that looseness or excess play had to be tolerated in return for low cost bearing constructions. Accordingly, it is not uncommon for certain users, such as owners of supermarket shopping carts, to accept bearing failures in a relatively short period of time due to severe shock loading that can occur during normal use thereof. It is a desire, therefore, of this invention to provide a wheel construction utilizing a bearing assembly which has successfully overcome the problem of developing looseness during use thereof in a wheel and assuring that the outer diameter of the wheel is concentric with the axis of the bearing assembly. In addition, it is desirable to provide a wheel construction wherein the shock loads applied to the wheel construction are isolated from the bearing assembly.

Accordingly, it is an object of this invention to provide a wheel construction wherein the axis of the bearing assembly is assured of being concentric with the outer diameter of the wheel.

A further object of the invention is to provide a wheel construction, as aforesaid, which is particularly adaptable for use in the wheels of a caster or the like, wherein the treatment received by the bearing assembly, even under normal conditions of use, is severe by any reasonable standard.

A further object of this invention is to provide a wheel construction, as aforesaid, having a sufficient structural simplicity that it can be assembled rapidly, accurately and inexpensively.

A further object of the invention is to provide a wheel construction, as aforesaid, comprised of a minimum member of parts, each part being of such structural configuration that it is capable of being assembled so that the strength of the assembly is increased during the assembly.

A further object of the invention is to provide a wheel construction, as aforesaid, in which the bearing assembly can be constructed in a variety of sizes and for a variety of specific uses with a minimum of modifications and structural limitations.

A further object of the invention is to provide a wheel construction, as aforesaid, wherein the full effect of shock loads or the like, applied to the wheel construction, are isolated from the bearing construction.

SUMMARY OF THE INVENTION

In general, the objects and purposes of the invention are met by providing a wheel construction having a bearing construction defining an axis of rotation, which bearing construction is housed in an elastomeric sleeve having an elastic compressibility characteristic. A pair of identically shaped metallic stampings are provided, each having a central cylindrical shell part axially aligned with the other and a hole extending through the central shell part in approximately the center thereof. The stampings each have a radially extending surface portion intermediate the central cylindrical shell part and a peripheral surface which is coextensive with the central plane through the wheel construction and perpendicular to the axis of rotation. The axially aligned central cylindrical shell parts house the bearing construction therein with at least a portion of the inner surface of the cylindrical shell part engaging the elastomeric sleeve. The radial surface portions of each of the metallic stampings slidingly engage one another. An annulus of moldable synthetic resin material is fixedly secured to the peripheral surface of the metallic stampings to resiliently hold the cylindrical shell parts and the surface portions in axial alignment. The annulus has an elastically flexible characteristic to thereby permit the pair of stampings to shift radially relative to one another while maintaining the surface portions in sliding engagement with one another.

BRIEF DESCRIPTION OF THE DRAWING

Other objects and purposes of the invention will be apparent to persons acquainted with wheel constructions of this general type upon reading the following specification and inspecting the accompanying drawing, in which.

Certain terminology will be used in the following description for convenience in reference only and will not be limiting. The words "in" and "out" will refer to directions toward and away from, respectively, the geometric center of the device and designated parts thereof. Such terminology will include the words above specifically mentioned, derivatives thereof and words of similar import.

DETAILED DESCRIPTION

Figure 1:
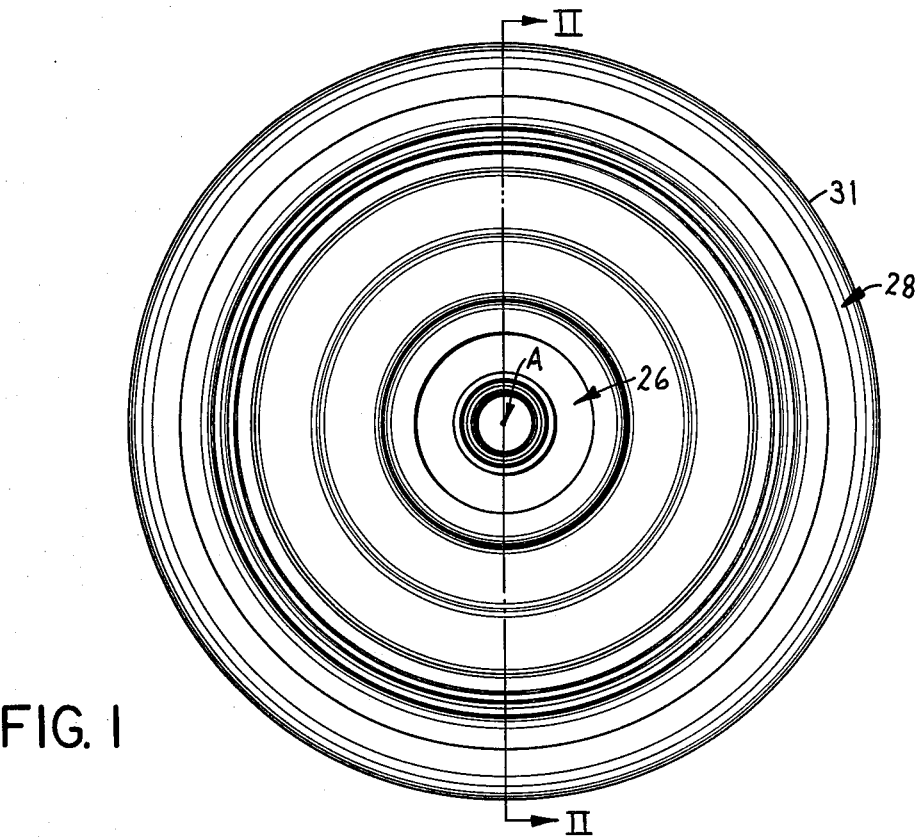
FIG. 1 is a side elevational view of a wheel construction embodying my invention.
Figure 2:
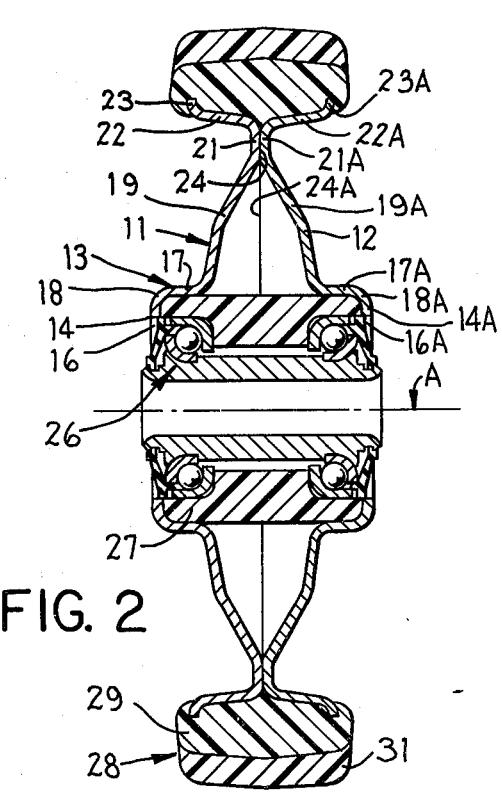
FIG. 2 is a sectional view taken along the line II—II in FIG. 1.

Referring to FIGS. 1 and 2, this wheel construction 10 includes a pair of identical metal disklike stampings 11 and 12. For purposes of discussion, the structure of the disk 11 will be described below. The corresponding structure of the disk 12 is identical to the structure associated with the disk 11, but each of the reference numerals used for the disk 11 will be utilized also for the corresponding parts of the disk 12 but will have the suffix "A" added thereto. The disk-like stamping 11 includes a cup-shaped section 13 having an end wall 14 with a central opening 16 therethrough connected to a cylindrical wall segment 17 connected to the bottom wall 14 through a rounded corner construction 18. The cylindrical will segment 17 is connected through an inclined wall segment 18 to a generally flat and radially extending wall segment 21. The outer periphery of the wall segment 21 is connected to an axially extending flange radially aligned with the wall segment 17 terminating in a radially outwardly extending tip 23. The various segments of the disks are the same but are oriented in a mirror imagelike manner so that the innermost surface 24 and 24A of the wall segments 21 and 21A engage each other along a parting plane and the inclined wall segments 19 and 19A and the cylindrical wall segments 17 and 17A extend away from each other to axially space the end walls 14 and 14A from each other.

The holes 16 and 16A in the end walls 14 and 14A, respectively, are axially aligned. In addition, the cup-shaped sections 13 and 13A define a housing for a bearing construction 26. This bearing construction is identical to the bearing construction shown in my aforementioned U.S. Pat. Nos. 3,807,817 and 4,072,373. Thus, a further detailed discussion of my bearing structure appears to be unnecessary. It should be stated, however, that my bearing construction 26 is housed within a resilient elastomeric sleeve 27.

The pair of disks 11 and 12 are held together so that surfaces 24 and 24A are in engagement with each other solely by an annulus of moldable synthetic resin material 28. The disks 11 and 12 are placed into a molding die with the bearing construction 26 mounted within the cup-shaped sections 13 and 13A. When the mold closes, the disks 11 and 12 are tightly held together so that the surfaces 24 and 24A engage each other and the annulus 28 is injection molded around the periphery of the disks 11 and 12. Upon a solidifying of the annulus 28, the disks 11 and 12 are resiliently held together and no other mechanical connection is required to hold the disks 11 and 12 together.

The position of the components of the wheel construction 10 in FIG. 2 is a position where the parting plane defined by the engaging surfaces 24 and 24A extends perpendicular to the axis of rotation A. When an external force is applied to the wheel construction primarily through the not illustrated yoke therefor, the disks 11 and 12 will shift radially with respect to one another so that the parting plane defined by and slidingly engaging surfaces 24 and 24A will assume an angle α which is out of perpendicular relationship with respect to the axis of rotation A. This phenomena is due particularly to the elastomeric sleeve 27 and the elastomeric treadstock 28. Thus, shock loads which are applied axially of the wheel will cause compression of the elastomeric sleeve 27 on diagonally opposite segments thereof, particularly the upper righthand segment and the lower lefthand segment, as illustrated in FIG. 3, and the elastomeric treadstock 28 will flex to thereby isolate the shock loads from the bearing construction.

In the preferred embodiment, the elastomeric sleeve 27 is a polyurethane material having a hardness in the range of 75 Shore A to 55 Shore D Durometer. The elastomeric material of the treadstock has a hardness in the range of 90 Shore A to 55 Shore D Durometer.

Figure 3:
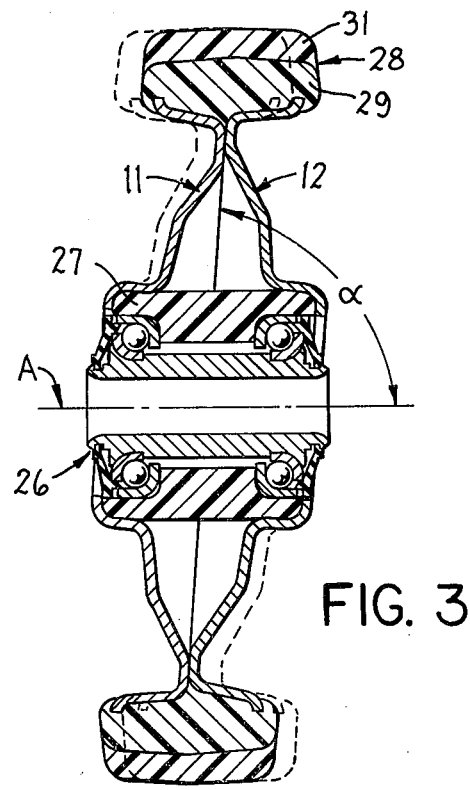
FIG. 3 is a sectional view similar to FIG. 2 but with the metal stampings shifted radially with respect to one another.

While the foregoing embodiment has described the treadstock 28 as being of a single elastomeric material, it is also possible to utilize a pair of elastomeric materials, as is specifically illustrated in FIGS. 2 and 3. That is, the elastomeric treadstock 28 is comprised of a first annulus 29 fixably secured to the periphery of the metal disks 11 and 12. This first annular disk has an elastomeric hardness in the range of 75 Shore A to 55 Shore D Durometer. A second annulus 31, made of preferably polyurethane, is injection molded around the periphery of the first annulus 29 so that the treadstock substantially completely encases the first annulus 29 in close and intimate contact therewith so that a fusion bonding therebetween occurs to thereby firmly and securely lock the treadstock to the first annulus.

Although a particular preferred embodiment of the invention has been disclosed in detail for illustrative purposes, it will be recognized that variations or modifications of the disclosed wheel construction, including the rearrangement of parts, lie within the scope of the present invention.

The embodiments of the invention, in which an exclusive property or privilege is claimed, are defined as follows:

1. A wheel construction, comprising:

bearing means defining an axis of rotation, said bearing means being housed in an elastically deformable elastomeric sleeve;

a pair of identically shaped metallic stampings, each having a central cylindrical shell part axially aligned with the other and means defining a hole therethrough in approximately the center thereof, said stampings each having a surface portion intermediate said central cylindrical shell part and a first peripheral surface which is coextensive with a central plane through said wheel construction and perpendicular to said axis of rotation, said axially aligned cylindrical shell parts of each stamping housing said bearing means therein with at least a portion of the inner surface of said cylindrical shell part engaging a portion of the external surface of said elastomeric sleeve adjacent the axial ends thereof and said surface portions slidingly engaging one another; and an elastically deformable annulus of moldable synthetic resin material and means for fixedly securing said annulus to said first peripheral surface of said pair of metallic stampings to effect, along with said elastomeric sleeve engaging said inner surface of said cylindrical shell parts, a holding of said cylindrical shell parts and said surface portions in axial alignment, the material of said annulus and said sleeve having an elastically deformable characteristic to thereby permit said pair of stampings to temporarily shift radially relative to one another against the elastic resistance of said annulus and said sleeve arising due to an elastic deformation of said annulus and said sleeve while maintaining said surface portions in sliding engagement with one another and to temporarily facilitate an orientation of said central plane inclined to said axis of rotation in response to shock loads having a component of force applied to said wheel construction in a direction parallel to said axis of rotation, said material further having a sufficient resistance to elastic deformation to thereby hold said metallic stamping in axial alignment during normal use thereof, said sleeve and said annulus thereby facilitating an absorption of said shock loads applied to said bearing means, said material further effecting a return of said pair of stampings to said axially aligned position thereof with said central plane oriented perpendicular to said axis of rotation following the termination of a shock load applied thereto.

2. A wheel construction according to claim 1, wherein said annulus includes a first annulus of a first elastically deformable, moldable synthetic resin material with said means fixedly securing said peripheral surface of said pair of metal stampings together and a second elastically deformable, annulus made of moldable synthetic resin material fixedly secured, through an intimately bonded relationship, to said first annulus and the peripheral surface thereof and having an outer diameter that is concentric with said axis of rotation.

3. A wheel construction according to claim 1, wherein said elastomeric sleeve is made of polyurethane.

4. A wheel construction according to claim 1, wherein said elastomeric sleeve has a hardness of 55 Shore D Durometer.

5. A wheel construction according to claim 1, wherein said annulus is made of an elastomeric material having a hardness in the range of 90 Shore A to 55 Shore D Durometer.

* * * * *

UNITED STATES PATENT AND TRADEMARK OFFICE
CERTIFICATE OF CORRECTION

PATENT NO. : 4 294 491
DATED : October 13, 1981
INVENTOR(S) : John W. Black

It is certified that error appears in the above—identified patent and that said Letters Patent is hereby corrected as shown below:

Col. 2, line 19; change "member" to ---number---.

Col. 3, line 31; change "will" to ---wall---.

Col. 3, line 32; change "18" to ---19---.

Col. 4, line 6; change "and" to ---the---.

Signed and Sealed this

Ninth Day of February 1982

[SEAL]

*Attest:*

GERALD J. MOSSINGHOFF

*Attesting Officer*     *Commissioner of Patents and Trademarks*